United States Patent Office 2,952,672

Patented Sept. 13, 1960

2,952,672

PREPARATION OF METAL SALTS OF PHOSPHORUS SULFIDE-HYDROCARBON REACTION PRODUCTS

Robert E. Karll and Eugene E. Richardson, Hammond, and Roger W. Watson, Highland, Ind., assignors to Standard Oil Company, Chicago, Ill., a corporation of Indiana No Drawing. Filed Oct. 12, 1955, Ser. No. 540,168

6 Claims. (Cl. 260—139)

The present invention relates to improvements in the preparation of neutralized reaction products of a phosphorus sulfide and a hydrocarbon, and more particularly is directed to improvements in neutralizing the reaction products of a phosphorus sulfide and a hydrocarbon with a basic metal compound.

Neutralized reaction products of a phosphorus sulfide and a hydrocarbon, particularly olefin polymers, are extensively used as lubricant additives in the preparation of improved lubricants for internal combustion engines. The use of such materials in lubricant compositions is described in U.S. Patents 2,316,080 and 2,316,082, issued April 6, 1943, to Clarence M. Loane and James W. Gaynor. The specifications of these patents disclose a neutralization of phosphorus sulfide-olefin polymer reaction products and phosphorus sulfide-hydrocarbon reaction products by treatment with various neutralizing agents at about 100° F.–400° F. While, in general, no difficulty is encountered in neutralizing such reaction products in the manner heretofore practiced, it has been observed that when neutralizing such reaction products with an amount of basic metal compound which would result in a basic composition having a metal to phosphorus ratio on the order of from 3 to about 10, difficulties are encountered by reason of the formation of gels which make it practically impossible to filter the product to remove unreacted basic metal compound and which gels result in decreased yields and increased manufacturing costs. As more and more fuels having high sulfur contents come into use, it becomes necessary to provide lubricants which have a high metal to phosphorus ratio, are basic and serve even more effectively as agents to neutralize acidic compounds, and which act as detergents to disperse particles of carbon, resin and the like in the lubricating oil. It is well known that increasing the metal content, and hence the basicity, of an additive of the type described herein will effectively increase the ability of the oil to neutralize acids formed by the combustion of the fuel. It is also known that the most economical way of increasing the metal content of a lubricating oil containing an additive of the type described herein is to increase the metal to phosphorus ratio of the additive rather than to increase the total amount of additive in the oil to obtain the desired metal content level. It has, however, heretofore been impractical to increase the metal to phosphorus ratio substantially without adversely affecting the filterability of the product.

It is an object of the present invention to provide an additive for lubricating oils having a relatively higher metal to phosphorus ratio than has heretofore been possible. It is a further object to provide a method of neutralizing reaction products of a phosphorus sulfide and a hydrocarbon with a basic metal compound whereby a readily filterable, and hence more economical, product is obtained. A more specific object is to provide a method of neutralizing the reaction product of a phosphorus sulfide and a hydrocarbon with a basic metal compound whereby a bright product, free of gel and having a high metal to phosphorus ratio is obtained. Other objects and advantages of the present invention will become apparent from the following description thereof.

In accordance with the present invention, the foregoing objects can be attained by admixing the reaction products of a phosphorus sulfide and a hydrocarbon, particularly olefin polymers, with from about 3 to about 15 parts by weight of a basic metal compound per part of phosphorus present in the phosphorus sulfide-hydrocarbon reaction product, and introducing below the surface of the neutralization mixture for a period of time of from about one to about ten hours, and preferably from about three to about five hours, from about 0.5 to about 2 mols of water per mol of the basic metal compound, and preferably about 1 mol of water per mol of the basic metal compound and from about 1 to about 20 mols of methyl, ethyl or propyl alcohol per mol of the basic metal compound used in the neutralization. The temperature of the neutralization mixture during the addition of the water and alcohol is maintained above the boiling point of the alcohol, i.e., in the range of from about 160 to about 250° F., and preferably in the range of from about 170 to about 190° F. The phosphorus sulfide hydrocarbon reaction product may be contacted with an absorbent clay, or otherwise treated before the neutralization step, to remove inorganic phosphorus compounds and low molecular weight organic phosphorus compounds. Both the phosphorus sulfide-hydrocarbon reaction product and the basic metal compound are preferably diluted with a normally liquid hydrocarbon before admixing and carrying out the neutralization step.

In the preparation of the phosphorus sulfide-hydrocarbon reaction product, the hydrocarbon is reacted with a phosphorus sulfide, such as $P_2S_3$, $P_4S_3$, $P_3S_7$, or other phosphorus sulfides, and preferably phosphorus pentasulfide, $P_2S_5$.

The hydrocarbon constituent of this reaction is described in detail in U.S. 2,316,088 issued to Loane et al. on April 6, 1943. Briefly, the hydrocarbon constituent is preferably a mono-olefin hydrocarbon polymer resulting from the polymerization of low molecular weight mono-olefinic hydrocarbons or iso-mono-olefinic hydrocarbons, such as propylenes, butylenes and amylenes, or the copolymers obtained by the polymerization of hydrocarbon mixtures containing iso-mono-olefins and mono-olefins of less than 6 carbon atoms. The polymers may be obtained by the the polymerization of these olefins or mixtures of olefins in the presence of a catalyst such as sulfuric acid, phosphoric acid, boron fluoride, aluminum chloride or other similar halide catalysts of the Friedel-Crafts type.

A suitable polymer for the reaction with phosphorus sulfide is the product obtained by polymerizing in the liquid phase a hydrocarbon mixture containing butylenes and isobutylenes together with butanes and some $C_3$ and $C_5$ hydrocarbons at a temperature between about 0° F. and 30° F., in the presence of aluminum chloride. A suitable method for carrying out the polymerization is to introduce the aluminum chloride into the reactor and introduce the hydrocarbon mixture cooled to a temperature of about 0° F. into the bottom of the reactor and pass it upwardly through the catalyst layer while regulating the temperature within the reactor so that the polymer product leaving the top of the reactor is at a temperature of about 30° F. After separating the polymer from the catalyst sludge and unreacted hydrocarbons, the polymer is fractionated to obtain a fraction of the desired viscosity, such as, for example, from about 80 seconds to about 2000 seconds Saybolt Universal at 210° F.

Essentially paraffinic hydrocarbons such as bright stock residuums, lubricating oil distillates, petrolatums, or paraffin waxes, may be used. There can also be employed the condensation products of any of the foregoing hydrocarbons, usually through first halogenating the hydrocarbons, with aromatic hydrocarbons in the presence of anhydrous inorganic halides, such as aluminum chloride, zinc chloride, boron fluoride, and the like.

Other preferred olefins suitable for the preparation of the hereindescribed phosphorus sulfide reaction products are olefins having at least 20 carbon atoms in the molecule of which from about 13 carbon atoms to about 18 carbon atoms, and preferably at least 15 carbon atoms are in a long chain. Such olefins can be obtained by the dehydrogenation of paraffins, such as by the cracking of paraffin waxes or by the dehalogenation of alkyl halides, preferably long chain alkyl halides, particularly halogenated paraffin waxes.

Also contemplated within the scope of the present invention are the reaction products of a phosphorus sulfide with an aromatic hydrocarbon, such as, for example, benzene, naphthalene, toluene, xylene, diphenyl and the like or with an alkylated aromatic hydrocarbon, such as, for example, benzene having an alkyl substituent having at least four carbon atoms, and preferably at least eight carbon atoms, such as long chain paraffin wax.

In general, the preparation of the phosphorus sulfide-hydrocarbon reaction product in accordance with the present invention is carried out in the following manner:

The hydrocarbon such as, for example, an olefinic polymer of the desired molecular weight, is reacted with from about 1% to about 50%, and preferably from about 5% to about 25%, of a phosphorus sulfide, e.g. $P_2S_5$, at a temperature of from about 200° F. to about 600° F. in a nonoxidizing atmosphere, such as for example, an atmosphere of nitrogen. The reaction is carried out for from about one to about ten hours or more, and preferably for about five hours. The phosphorus sulfide-hydrocarbon reaction can, if desired, be carried out in the presence of a sulfurizing agent as described in U.S. 2,316,087, issued to J. W. Gaynor and C. M. Loane April 6, 1943. The reaction product obtained is then hydrolyzed at a temperature of from about 200° F. to about 500° F., and preferably at a temperature of 300° F. to 400° F., by a suitable means, such as for example, by introducing steam through the reaction mass. The hydrolyzed product containing inorganic phosphorous acids formed during the hydrolysis may then be contacted with an adsorbent material such as Attapulgus clay, fuller's earth and the like at a temperature of from about 100° F. to about 500° F., as more fully described and claimed in U.S. 2,688,612 issued to Roger W. Watson, and the treated, hydrolyzed product filtered to obtain a filtrate substantially free of inorganic phosphorus acids and low molecular weight organic phosphorus compounds. Although such a clay treating step has been found to be preferable when the prior art methods of neutralizing the phosphorus sulfide-hydrocarbon reaction product are employed, we have found that it is not necessary when using the neutralization process of this invention. Yields of from about 10 to 20% or higher are obtained when using our process as compared to the prior art methods wherein the clay treating step is employed.

The hydrolyzed reaction product of phosphorus sulfide and a hydrocarbon, preferably treated in the above manner with or without clay treating, is then diluted with a normally liquid hydrocarbon, generally the same as or similar to the hydrocarbon oil in which the finished additive is to be employed, to a phosphorus content of from about 0.5% to about 5% or more. The neutralization step is carried out wtih a suitable basic metal compound such as a hydroxide, carbonate, oxide or sulfide of an alkaline earth metal or an alkali metal such as, for example, potassium hydroxide, sodium hydroxide, barium oxide, barium sulfide or the like. Other basic metal compounds may also be used such as, for example, lead oxide, mercuric oxide, or the like. It is preferable, however, to use an alkaline earth metal compound and particularly barium oxide.

The basic metal compound may be admixed directly with the phosphorus sulfide-hydrocarbon reaction product; it is preferable, however, to form a slurry of the basic metal compound in a normally liquid hydrocarbon of a type comparable to the lubricating oil in which the additive is to be used. The total amount of the basic metal compound present in the slurry should be from about 3 to about 15 parts by weight per part of phosphorus present in the phosphorus sulfide-hydrocarbon reaction product which is to be neutralized therewith.

The alcohol and water are introduced below the surface of the admixture of the basic metal compound slurry and the oil diluted phosphorus sulfide-hydrocarbon reaction product. It is not essential that the water and alcohol be introduced together or simultaneously, however, it is convenient to pre-mix the water and alcohol and add them in a single stream or in multiple streams to secure better mixing. We have found that the optimum amount of water necessary is about 1 mol per mol of basic metal compound used in the neutralization, although as little as 0.5 mol of water or as much as 2 mols of water per mol of basic metal compound may be used. If not enough water is used in the neutralization step, the neutralized product tends to gel thereby becoming difficult to filter. If too much water is used, we have found that the neutralized product is not always clear and bright and that high ratios of metal to phosphorus are not consistently obtainable. From about 1 to about 20 mols of an alkyl alcohol of from 1 to 3 carbon atoms per mol of basic metal compound used in the neutralization step may be used; it is preferable, however, to use up to about 5 mols of alcohol per mol of basic metal compound. Either methyl, ethyl or propyl alcohol may be used; it is preferable, however, to use methyl alcohol.

After admixing the oil-diluted phosphorus sulfide-hydrocarbon reaction product and the basic metal compound slurry, the mixture is preferably heated to a temperature above the boiling point of the particular alcohol to be employed; for example, if methanol is employed, the reaction mixture is heated to about 165° F., whereas if isopropanol is employed, the reaction mixture is heated to about 185° F. or higher. After attaining reaction temperature, alcohol and water, as pointed out hereinbefore, are introduced below the surface of the reaction mixture at such a rate that will be completely added in a period of time of preferably from about 3 to about 5 hours. The reaction mixture is maintained at a temperature above the boiling point of the alcohol during this addition. After all of the alcohol and water have been added, the temperature is increased to about 400° to drive off any remaining water and alcohol and the product is then filtered.

To illustrate our invention, the data shown in Table I was obtained. The runs shown are laboratory preparations and illustrate the neutralization of a hydrolyzed, clay treated reaction product of phosphorus pentasulfide and a butylene polymer of about 1000 molecular weight. The basic metal compound used in the neutralization was barium oxide and the alcohol was methanol. The phosphorus pentasulfide-butylene polymer reaction product was diluted with an SAE 5W lubricating oil such that the percent phosphorus in the diluted mixture was about 2%, and the amount of barium employed in the neutralization reaction on a weight basis was in an amount equal to seven times the amount of phosphorus in the diluted phosphorus pentasulfide-butylene polymer reaction product.

*Table I*

| Run | Reaction Conditions | | | | Product | | |
|---|---|---|---|---|---|---|---|
| | Wt. Ratio Ba/P | Mol Ratio | | Temp., °F. | Filter Rate | Ba/P Wt. Ratio | Clarity |
| | | $H_2O$/BaO | $CH_3OH$/BaO | | | | |
| 1 | 7 | 0 | 3.25 | 170–175 | 0 (gelled) | | |
| 2 | 7 | 0.68 | 3.25 | 170–175 | Fair | 5.3 | Bright. |
| 3 | 7 | 0.83 | 3.25 | 170–175 | Good | 5.3 | Do. |
| 4 | 7 | 0.93 | 3.25 | 170–175 | do | 5.5 | Do. |
| 5 | 7 | 1.44 | 3.25 | 170–175 | Fair | 5.4 | Hazy. |

The above data (Table I) show that using alcohol and water within the ranges hereinbefore described results in a product which is easy to filter, has a high barium to phosphorus ratio and is bright and clear. Run 1 shows the effect of omitting water, in which case it was impossible to filter the product due to the formation of a gel. If alcohol is omitted and water used in the range described herein, it has been observed that the Ba/P ratio is low. Although not shown, if both alcohol and water are omitted, the product tends to gel when using a Ba/P ratio of 7 in the charge; lower Ba/P ratios in the charge without the addition of water and alcohol, which is typical of the prior art methods, yield products of fair filter rate and good clarity but having a correspondingly lower Ba/P ratio.

A plant run was also made to demonstrate the neutralization in accordance with our invention as follows: 632 gallons of an oil-diluted, clay contacted, hydrolyzed phosphorus pentasulfide-butylene polymer (1000 molecular weight) reaction product having a phosphorus content of 2.4%, was admixed with 400 gallons of a solvent extracted SAE 5W base oil and charged to a reaction kettle and heated to 165° F. An oil slurry of barium oxide (950 lbs. BaO—6.25 parts by weight Ba per part P in charge—and 100 gallons solvent extracted SAE 5W oil) was added to the heated mixture over a period of about one hour while a methanol-water mixture (80 gallons methanol and 12 gallons water equivalent to 2.64 mols of methanol and .9 mol of water per mol of BaO) was added over a period of 4 hours, the first hour of addition running concurrently with the addition of the barium oxide slurry. The temperature during the neutralization was maintained between 160–180° F. by circulating the mixture through a cooler. After 4 hours, the neutralized material was heated to 400° F. to drive off any remaining water and alcohol, and the product was filtered. The filter rate was good and the finished additive was bright and clear and contained 1.3% P and 6.7% Ba, thus having a Ba/P ratio of 5.15.

While, as noted above, the phosphorus sulfide-hydrocarbon reaction product may be neutralized, with or without prior contact with clay, it is contemplated within the scope of this invention, that other steps in addition to, or in lieu of, the clay treating step may be employed.

The metal containing, neutralized reaction products of a phosphorus sulfide and a hydrocarbon obtained in accordance with the present invention are useful as additives and lubricant compositions used for the lubrication of internal combustion engines.

Percentages given herein and in the appended claims are weight percentages unless otherwise noted.

While we have described our invention by reference to specific embodiments thereof, the same are given by way of illustration only. Modifications and variations will be apparent from our description to those skilled in the art.

We claim:

1. In the preparation of a metal-containing neutralized reaction product of a phosphorus sulfide and a hydrocarbon in which the hydrocarbon is reacted with from about 1% to about 50% of a phosphorus sulfide at a temperature of from about 200° F. to about 600° F. and neutralized; the improvement comprising neutralizing the phosphorus sulfide-hydrocarbon reaction product with from about 3 to about 15 parts by weight of a basic barium compound per part of phosphorus present in said phosphorus sulfide-hydrocarbon reaction product while introducing into the neutralization mixture for a period of time of from about 1 to about 10 hours from about 0.5 to 2 mols of water per mol of said basic barium compound and from about 1 to about 20 mols of an alkyl alcohol per mol of said basic barium compound, which alcohol has from 1 to 3 carbon atoms in the alkyl group; at a temperature above the boiling point of the alcohol.

2. The method of neutralizing the reaction product of a phosphorus sulfide and a hydrocarbon, in which the hydrocarbon is reacted with from about 1% to about 50% of a phosphorus sulfide at a temperature of from about 200° F. to about 600° F., with a basic barium compound, which method comprises diluting said phosphorus sulfide-hydrocarbon reaction product with a normally liquid hydrocarbon to a phosphorus content of from about 1.5% to about 5%, diluting about 3 to about 15 parts by weight of a basic barium compound per part of phosphorus present in said phosphorus sulfide-hydrocarbon reaction product with a normally liquid hydrocarbon to form a slurry, admixing said diluted phosphorus sulfide-hydrocarbon reaction product and said basic barium compound slurry, introducing below the surface of the mixture for a period of time of from about 1 to about 10 hours from about 0.5 to about 2 mols of water per mol of said basic barium compound and from about 1 to about 20 mols of an alkyl alcohol, having from 1 to 3 carbon atoms in the alkyl group, maintaining said mixture during the addition of said alcohol and said water at a temperature above the boiling point of the alcohol, and then heating said neutralized mixture to about 400° F. to drive off said water and said alcohol.

3. The method of claim 2 wherein said basic barium compound is barium oxide.

4. The method of claim 2 wherein said phosphorus sulfide-hydrocarbon reaction product is the reaction product of $P_2S_5$ and a butylene polymer having a molecular weight of from about 500 to about 50,000.

5. The method of claim 2 wherein said alcohol is methanol.

6. The method of claim 2 wherein said phosphorus sulfide-hydrocarbon reaction product is contacted with an adsorbent clay at a temperature of from about 100° F. to about 500° F. before said neutralization step.

References Cited in the file of this patent

UNITED STATES PATENTS

| | | |
|---|---|---|
| 2,316,088 | Loane et al. | Apr. 6, 1943 |
| 2,316,091 | White | Apr. 6, 1943 |
| 2,342,431 | Smith et al. | Feb. 22, 1944 |
| 2,368,000 | Cook et al. | Jan. 23, 1945 |
| 2,388,199 | Williams et al. | Oct. 30, 1945 |
| 2,647,889 | Watson et al. | Apr. 4, 1953 |
| 2,695,910 | Asseff et al. | Nov. 30, 1954 |
| 2,806,022 | Sabol | Sept. 19, 1957 |